United States Patent [19]

O'Hara

[11] 4,098,682

[45] Jul. 4, 1978

[54] HYDRODESULFURIZATION CATALYST AND METHOD OF PREPARATION

[75] Inventor: Mark J. O'Hara, Mt. Prospect, Ill.

[73] Assignee: UOP Inc., Des Plaines, Ill.

[21] Appl. No.: 798,220

[22] Filed: May 18, 1977

Related U.S. Application Data

[62] Division of Ser. No. 697,800, Jun. 18, 1976, Pat. No. 4,048,115.

[51] Int. Cl.$^2$ ............................................. C10G 23/02
[52] U.S. Cl. ................................................... 208/216
[58] Field of Search ........................ 208/216; 252/465

[56] References Cited

U.S. PATENT DOCUMENTS

| | | | |
|---|---|---|---|
| 3,162,607 | 12/1964 | Burbidge et al. | 208/216 R |
| 3,873,470 | 3/1975 | Conway et al. | 252/465 |
| 3,935,127 | 1/1976 | Conway | 252/465 |
| 4,013,547 | 3/1977 | Mickelson | 208/216 PP |
| 4,032,433 | 6/1977 | Petri et al. | 208/216 R |
| 4,048,115 | 9/1977 | O'Hara | 252/465 |

*Primary Examiner*—George Crasanakis
*Attorney, Agent, or Firm*—James R. Hoatson, Jr.; John G. Cutts, Jr.; William H. Page, II

[57] ABSTRACT

A desulfurization catalyst which demonstrates superior desulfurization activity and which contains an inorganic oxide carrier material, a Group IVB metal component and a Group VIII metal component. The catalyst is prepared by (a) extruding at least 10% of the Group VIII metal component with the inorganic oxide carrier material, and (b) impregnating the resulting extrudate with a sufficient quantity of Group VIB and Group VIII metal components to yield a finished catalyst containing the requisite metallic component content.

6 Claims, No Drawings

HYDRODESULFURIZATION CATALYST AND METHOD OF PREPARATION

CROSS REFERENCE TO RELATED APPLICATIONS

This application is a division of my copending application Ser. No. 697,800, filed June 18, 1976, now U.S. Pat. No. 4,048,115, Sep. 13, 1977.

DESCRIPTION

Desulfurization is a process deeply rooted in petroleum refining technology. Published literature abounds with references relative to suitable catalysts, methods of catalyst manufacture and the techniques employed in the utilization thereof. Although desulfurization connotes the destructive removal of sulfurous compounds, through conversion into hydrogen sulfide and hydrocarbons, it is often included in the broad term "hydrorefining". Hydrorefining processes are effected at operating conditions which promote denitrification and desulfurization primarily, and asphaltene conversion, nondistillable conversion, hydrogenation and hydrocracking to some extent. In other words, the terms "hydrorefining" and desulfurization are generally employed synonymously to allude to a process wherein a hydrocarbonaceous feedstock is "cleaned up", in order to prepare a charge stock suitable for utilization in a subsequent hydrocarbon conversion process, and in which some conversion to lower-boiling products is effected.

For example, it is especially advantageous to catalytically reform various straight run gasolines, natural gasolines, catalytically cracked naphtha fractions and/or thermally cracked hydrocarbon distillates for the primary purpose of improving the motor fuel and antiknock characteristics thereof. The hydrorefining process is utilized to produce a substantially saturated charge stock, for use in the catalytic reforming process, which charge stock is substantially free from sulfurous and nitrogenous compounds. Desulfurization processes are not, however, limited to improving the physical and chemical characteristics of a naphtha boiling range charge stock. The literature is replete with a multitude of processes and catalysts to be employed in the treatment of heavier charge stocks including kerosenes, light gas oils, full boiling range gas oils, heavy gas oils and even "black oils." In petroleum refining technology, a black oil is considered to be one containing excessive quantities of sulfurous and nitrogenous compounds, high molecular weight organometallic complexes principally comprising nickel and vanadium, and asphaltic material. Black oils are further characterized as containing nondistillable material — having a boiling point above a temperature of 1,050° F.

A principal object of the present invention is to provide a novel catalytic composite for use in the desulfurization of hydrocarbonaceous material.

Another object is to provide an improved process for desulfurizing a sulfurous hydrocarbon charge stock, which process is effected utilizing a catalytic composite comprising an inorganic oxide carrier material, a Group VIB metal component and a Group VIII metal component.

Therefore, in one embodiment, the present invention relates to a desulfurization catalyst comprising an inorganic oxide carrier material, a Group VIB metal component and a Group VIII metal component wherein said catalyst is prepared by (a) extruding at least 10% of the Group VIII metal component with the inorganic oxide carrier material, and (b) impregnating the resulting extrudate with a sufficient quantity of Group VIB and Group VIII metal components to yield a finished catalyst containing the requisite metallic component content.

In another embodiment, the desulfurization conditions include a maximum catalyst bed temperature of about 200° to about 900° F., a pressure of about 200 to about 5000 psig., an LHSV of about 0.1 to about 10 and a hydrogen circulation rate of about 500 to about 50,000 scf/bbl.

Other objects and embodiments of my invention relate to additional details regarding the preferred catalytic ingredients, the concentration of components within the catalytic composite, the method of catalyst preparation, preferred processing techniques and similar particulars which are hereinafter presented.

Catalytic composites which are tailored for the conversion of hydrocarbonaceous material, and particularly for use in a hydrorefining process, have traditionally consisted of metallic elements chosen from Groups VIB and VIII of the Periodic Table. In general, preferred metal components have been nickel-molybdenum, nickel-tungsten or cobalt-molybdenum, and these components are generally combined with a porous carrier material comprising alumina or silica, either amorphous, or zeolitic in nature.

The prior art indicates a preference for two particular methods of catalyst preparation. One method, predominantly preferred, involved impregnating a previously calcined, preformed carrier material, generally in the form of spheres or pills, with suitable soluble compounds of the Group VIB and VIII components. The impregnating technique is generally followed by drying at a temperature of about 300° F., and calcination at a temperature of about 1100° F. The second preparation scheme involved coprecipitating all the components, including those of the carrier material.

A very active and stable desulfurization catalyst can be prepared by extruding at least 10% of the Group VIII metal component with the inorganic oxide carrier material and subsequently impregnating the resulting extrudate with a sufficient quantity of Group VIB and Group VIII metal components to yield a finished catalyst containing the requisite metallic component content.

An essential feature of the present invention is that the porous carrier material be co-extruded with at least 10% of the Group VIII metal component. It is preferred that the porous carrier material be an adsorptive, high-surface area support. Suitable carrier materials are selected from the group of amorphous refractory inorganic oxides including alumina, titania, zirconia, silica, chromia, magnesia, boria, hafnia, and mixtures of two or more, including alumina-zirconia, silica-alumina, alumina-silica-boron phosphate, etc. In many applications of the present invention, the carrier material will consist of a crystalline aluminosilicate. This may be naturally-occurring or syntethically prepared, and includes mordenite, faujasite, Type A or Type U molecular sieves, etc. Following the formation of the extrudate, the composite will generally be dried at a temperature in the range of about 200° to about 600° F., for a period of from about 2 to about 24 hours or more, and finally calcined at a temperature of about 700° to about 1200° F., in an atmosphere of air, for a period of about 0.5 to about 10 hours. When the carrier material comprises a crystalline aluminosilicate, it is preferred that the calcination temperature not exceed about 1000° F.

The second essential feature of the present invention is that the resulting extrudates are impregnated with a sufficient quantity of Group VIB and Group VIII metal components to yield a finished catalyst containing the requisite metallic component content.

Reference to Group VIB herein is intended to allude to the Periodic Table of the Elements, E. H. Sargent & Co., 1964, and includes chromium, molybdenum and tungsten. The preferred Group VIB component is molybdenum. Furthermore, reference to Group VIII herein is intended to include iron, cobalt, nickel, ruthenium, rhodium, palladium, osmium, iridium and platinum. The preferred Group VIII component is cobalt.

Proportions of the Group VIB and VIII metallic components are utilized which will result in a final catalytic composite comprising from about 0.1% to about 20% by weight of the Group VIB component and from about 0.1% to about 10% by weight of the Group VIII component, calculated as the elemental metals.

The initial step in the catalyst preparation method involves commingling the preformed carrier material, for example, alumina, with salts of the desired metallic component. The solid mixture is ground to a talc-like powder, about 20 to 100 mesh, and preferably from 30 to 50 mesh, and intimately admixed with a relatively minor quantity of a suitable acid such as hydrochloric acid, nitric acid, or any other suitable peptizing agent. A preferred technique involves mulling the acidic mixture which is subsequently aged for a period of about 15 minutes to about 24 hours. The resulting plastic-type mass is extruded under a suitable pressure in the range of about 100 to about 10,000 psig. to form extrudates of the desired size, e.g., about 1/16 inch diameter extrudate with L/O ratio of about 2 to 4. After drying and calcining in the manner hereinbefore set forth, the remaining required metallic components are added to the dried extrudate by an impregnation technique. Suitable soluble metallic salts are selected to prepare an impregnating solution for the immersion of the extrudates. The impregnated extrudates are then dried and oxidized at 800° to 1400° F.

Although not essential to successful hydro-processing, it is often advisable to incorporate a halogen component into the catalytic composite, particularly where the same is to be utilized in a hydrocracking process. Although the precise form of the chemistry of association of the halogen component with the carrier material and the metallic components is not accurately known, it is customary in the art to refer to the halogen component as being combined with one of the other ingredients of the catalyst. The halogen may be either fluorine, chlorine, iodine, bromine, or mixtures thereof, with fluorine and chlorine being particularly preferred. The quantity of halogen is such that the final catalytic composite contains about 0.1% to about 3.5% by weight, and preferably from about 0.5% to about 1.5% by weight, calculated on the basis of the elemental halogen.

Prior to its use in the conversion of hydrocarbons, the catalytic composite is generally subjected to a substantially water-free reduction technique. Substantially pure and dry hydrogen (less than about 30.0 vol. ppm. of water) is employed as the reducing agent. The calcined catalytic composite is contacted at a temperature of about 400° to about 1000° F., for a period of about 0.5 to about 10 hours, and effective to substantially reduce metallic components.

Additional improvements are generally obtained when the reduced composite is subjected to presulfiding for the purpose of incorporating therein from about 0.5% to about 8.0% by weight of sulfur, on an elemental basis. This presulfiding treatment is effected in the presence of hydrogen and a suitable sulfur-containing compound such as hydrogen sulfide, lower molecular weight mercaptans, various organic sulfides, carbon disulfide, etc. The preferred technique involves treating the reduced catalyst with a sulfiding gas, such as a mixture of hydrogen and hydrogen sulfide having about 10 mols of hydrogen per mol of hydrogen sulfide, at conditions selected to effect the desired incorporation of sulfur. It is generally considered a good practice to perform the presulfiding technique under substantially water-free conditions. The catalyst may also be sulfided with a charge stock containing sulfur.

In accordance with my invention, the hydrocarbon charge stock and hydrogen are contacted with a catalyst of the type described above in a hydrocarbon conversion zone. The contacting may be accomplished by using the catalyst in a fixed-bed system, a moving-bed system, and a fluidized-bed system, or in a batch-type operation. In view of the risk of attrition loss of the catalyst, and further in view of the technical advantages attendant thereto, it is preferred to utilize a fixed-bed system. In this type of system, a hydrogen-rich vaporous phase and the charge stock are preheated by any suitable heating means to the desired initial reaction temperature, the mixture being passed into the conversion zone containing the fixed-bed of the catalytic composite. It is understood, of course, that the hydrocarbon conversion zone may consist of one or more separate reactors having suitable means therebetween to insure that the desired conversion temperature is maintained at the inlet to one or more catalyst beds. The reactants may be contacted with the catalyst in either upward, downward, or radial flow fashion, with a downward-/radial flow being preferred.

Hydroprocessing reactions are generally exothermic in nature, and an increasing temperature gradient will be experienced as the hydrogen and charge stock traverse the catalyst bed. It is desirable to maintain the maximum catalyst bed temperature below about 900° F., which temperature is virtually identical to that which may be conveniently measured at the outlet of the reaction zone. In order to insure that the catalyst bed temperature does not exceed the maximum allowed, conventional quench streams, either normally liquid or normally gaseous, and introduced at one or more intermediate loci of the catalyst beds, may be utilized.

The following examples are presented in illustration of the catalyst of this invention and a method of preparation thereof, and are not intended as an undue limitation on the generally broad scope of the invention as set out in the appended claims.

EXAMPLE

This example describes the preparation and testing of four alumina-cobalt-molybdenum catalysts. Each of these four catalysts was tested to determine the ability to desulfurize a vacuum gas oil charge stock having the properties indicated in the following Table I:

Table I

| Vacuum Gas Oil Charge Stock Properties | |
|---|---|
| Gravity, ° API | 19.8 |

Table I-continued

| Vacuum Gas Oil Charge Stock Properties | |
|---|---|
| Sulfur, wt.% | 2.65 |
| Nitrogen, wt.% | 0.16 |
| Distillation, ° F. | |
| IBP | 560 |
| 10% | 730 |
| 30% | 798 |
| 50% | 851 |
| 70% | 907 |
| 90% | 988 |
| E.P. | 1068 |

Catalyst 1 was prepared by impregnating 1/16-inch alumina spheres with an aqueous solution of water-soluble salts of cobalt and molybdenum and by subsequently drying and calcining the spheres to yield a finished catalyst which contained 2.7 wt. % cobalt and 9.0 wt. % molybdenum, calculated as the elemental metals. Catalyst 1 was tested with a vacuum gas oil charge stock which is hereinabove described and the relative activity (RA) for desulfurization of this catalyst was arbitrarily set equal to 100. Such a catalyst is commercially acceptable for the desulfurization of hydrocarbons.

Catalyst 2 was prepared in the same manner as Catalyst 1 with the exception that the metals' levels were increased to 3.4 wt. % cobalt and 11.6 wt. % molybdenum. Catalyst 2 had a relative activity of 102.

Catalyst 3 was prepared by admixing a finely divided alumina with sufficient quantities of cobalt and molybdenum salts to produce an extruded carrier material containing 0.9 wt. % cobalt and 3.3 wt. % molybdenum or 26% and 28.5% respectively of the total required metals of the finished catalyst. The admixture of finely divided alumina and metal salts was extruded and the extrudates were formed into spheres by the extrudates in a marumerizer. The spheres were dried, calcined and then impregnated with an aqueous solution of water-soluble salts of cobalt and molybdenum to yield a finished catalyst which contained 3.4 wt. % cobalt and 11.6 wt. % molybdenum, calculated as the elemental metals. Catalyst 3 was tested for desulfurization activity in identically the same manner as was Catalyst 1 and the relative activity for Catalyst 3 was 164.

Catalyst 4 was prepared according to the method of the present invention and wherein finely divided alumina was admixed with a sufficient quantity of cobalt salt to produce an extruded carrier material containing 0.9 wt. % cobalt or 26% of the total required cobalt of the finished catalyst. The admixture of finely divided alumina and cobalt metal salt was extruded and the extrudates were formed into spheres by spinning the extrudates in a marumerizer. The spheres were dried, calcined and then impregnated with an aqueous solution of water-soluble salts of cobalt and molybdenum to yield a finished catalyst which contained 3.4 wt. % cobalt and 11.6 wt. % molybdenum, calculated as the elemental metals. Catalyst 4 was tested for desulfurization activity in identically the same manner as was Catalyst 1 and the relative activity for Catalyst 4 was 185. The extraordinary increase in desulfurization activity is extremely impressive and the significance of such an improved catalyst will be readily discerned by those skilled in the art. The results obtained from desulfurizing the hereinabove described vacuum gas oil with the above-mentioned catalysts are presented in tabular from in Table II.

TABLE II

| | | EVALUATION FOR DESULFURIZATION ACTIVITY | | | | |
|---|---|---|---|---|---|---|
| CATA-LYST | CAR-RIER | METALS IN CARRIER | | TOTAL METALS | | RELATIVE ACTIVITY |
| | | WT. % COBALT | WT. % MOLYBDENUM | WT. % COBALT | WT. % MOLYBDENUM | |
| 1 | Alumina | 0 | 0 | 2.7 | 9.0 | 100 |
| 2 | Alumina | 0 | 0 | 3.4 | 11.6 | 102 |
| 3 | Alumina | 0.9 | 3.3 | 3.4 | 11.6 | 164 |
| 4 | Alumina | 0.9 | 0 | 3.4 | 11.6 | 185 |

The foregoing specification and example clearly illustrate the improvements encompassed by the present invention and the benefits to be afforded a desulfurization catalyst prepared according to the method of the present invention.

I claim as my invention:

1. A process for desulfurizing a sulfurous hydrocarbon charge stock which comprises reacting said charge stock and hydrogen, at desulfurization conditions selected to convert sulfurous compounds into hydrogen sulfide and hydrocarbon, in contact with a desulfurization catalyst comprising an inorganic oxide carrier material, from about 0.1% to about 20% by weight of a Group VIB metal component and from about 0.1% to about 10% by weight of a Group VIII metal component, calculated as the elemental metals, prepared by the method which comprises the steps of:
   (a) extruding said carrier material in admixture with a salt of a Group VIII metal in an amount sufficient to supply at least 10% but not all of said Group VIII metal component;
   (b) drying the resultant extrudate;
   (c) calcining said dried extrudate at 700–1200° F.;
   (d) impregnating the calcined extrudate with Group VIB and Group VIII metal salts in sufficient amount to supply the remainder of said Group VIII metal component and all of said Group VIB metal component;
   (e) drying the thus impregnated extrudate, and
   (f) calcining the said impregnated extrudate at 800–1400° F.

2. The process of claim 1 wherein said inorganic oxide carrier material is alumina.

3. The process of claim 1 wherein said desulfurization conditions include a maximum catalyst bed temperature of about 200° F. to about 900° F.

4. The process of claim 1 wherein said desulfurization conditions include a pressure of about 200 to about 5000 psig.

5. The process of claim 1 wherein said desulfurization conditions include a LHSV of about 0.1 to about 10.

6. The process of claim 1 wherein said desulfurization conditions include a hydrogen circulation rate of about 500 to about 50,000 scf/bbl.